3,300,473
PREPARATION OF MODIFIED PRODUCTS OF GALACTOMANNANES, POLYURONIC ACIDS AND SIMILAR HIGH-MOLECULAR NATURAL SUBSTANCES
Cla Christoffel and Eric A. Borel, Waedenswil, and Artur Blumenthal, Zurich, Switzerland, assignors to Blattmann & Co., Waedenswil, Switzerland, a company of Switzerland
No Drawing. Filed Aug. 16, 1963, Ser. No. 302,728
Claims priority, application Switzerland, Aug. 21, 1962, 9,975/62; May 29, 1963, 6,796/63
9 Claims. (Cl. 260—209)

This invention relates to a process for the production of degradation products and other modified products of mucilaginous natural substances of high molecular weight belonging to the group consisting of galactomannanes, polyuronic acids and galactanes. It relates also to improved derivatives and/or degradation products prepared by the process.

According to the processes hitherto known, the degradation of galactomannanes, polyuronic acids and similar high-molecular natural substances is carried out in aqueous suspensions or by a roasting process in open pans or by mechanical degradation. These processes have important disadvantages among which are:

In the degradation of such substances in aqueous suspension additional working steps are necessary for the dispersion of pulverulent, dry starting materials in the liquid media and for the isolation and drying of the derivatives, and there is a considerable loss of water soluble portions of the products in the liquid. Therefore, degradation in suspension can be used to a limited extent only and is expensive. The roasting process in open pans tends to burn the raw material, causing the formation of non-uniform products, and due to the presence of atmospheric oxygen in the roasting process discolorations occur and dark colored degradation products are obtained. Moreover, when pulverulent organic substances are roasted at the higher degradation temperatures in the presence of oxygen, there is great danger of explosions. Mechanical degradation, e.g. by means of ball mills, is time-consuming and rather limited in its usefulness, being effective only to bring about slight degrees of degradation.

An important object of the present invention is to provide a process by which the above mentioned disadvantages can be overcome.

It is another important object of the invention to provide new and improved thermal modification products of mucilaginous natural substances such as galactomannanes, polyuronic acids and galactanes, which are useful for purposes not served by known products of the thermal modification or degradation of such substances.

According to the present invention, galactomannanes, polyuronic acids and galactanes and mixtures containing any of these high molecular mucilaginous natural substances, prepared in the form of a finely divided or pulverulent mass containing one or more of such substances in native, pretreated and/or partially degraded condition, are subjected under vacuum and with a gradual increase of temperature, advantageously after being impregnated with a reactant capable of degrading or otherwise modifying the material chemically, to a continuous decrease of their water content until the material is dehydrated so extensively that practically no moisture will evaporate from the mass in the ensuing treatments. This heating with dehydration under vacuum is carried on at temperatures well below 110° C. and insufficient to cause pasting in the mass. Then the mass is subjected, at an increased temperature when desired, which does not exceed 180° C., to a thermal treatment or to such treatment accompanied by the chemical action of said reactant, while oxygen is excluded from access to the mass by carrying out this treatment under vacuum, in an inert atmosphere or in the presence of other non-oxidizing or reducing gases; and when a desired degree of modification of the material is attained, the mass is cooled to a temperature near normal atmospheric temperatures, still with the exclusion of oxygen.

The starting materials that can be modified advantageously according to the invention include galactomannanes, such as carob or locust bean gum and guar, polyuronic acids, such as tragacanth, gum arabic, pectins, algin or carageenin and alginates, and galactanes, such as agaragar, and also mixtures of these substances one with another or with other thermally degradable carbohydrate materials. The starting materials can be used in native, pretreated, or partially degraded condition, provided that they are in a dry to moist pulverulent form. Among the pretreatments which can be applied to them are a mechanical treatment, e.g. by fine grinding, a chemical treatment, e.g. with $SO_2$, a biochemical treatment, e.g. by enzymes, or any desired combination of these.

Among the reactants which can be used are the following which serve to accelerate or enhance the thermal degradation of the mucilaginous substance: organic or inorganic acids, such as, for example, hydrochloric acid, nitric acid, phosphoric acid, formic acid, acetic acid, oxalic acid and others; and inorganic and/or organic salts, such as, for example, ammonium chloride, sodium hydrogen sulfate, aluminum chloride, aluminum sulfate, calcium chloride, sodium oxalate, sodium phthalate, and other alkali and alkaline-earth salts.

The process can also be carried out to advantage by the use of reactants which enter into chemical combination with the finely divided mucilaginous substance or with its dehydration or degradation products, for the preparation of derivatives by reactions such as, for example, etherification with ethylene oxide, propylene oxide, monochloroacetic acid or the like, esterification, acetal-formation with formaldehyde, polyoxymethylene, acetaldehyde, a dialdehyde such as glyoxal, or the like, or nitrogenization with ammonia, urea, trimethylamine, hydrazine, triethanolamine, or other reactive nitrogen or amino compounds.

The water content of the dry to moist pulverulent starting material can vary within wide limits, the process being applicable to predried products which contain less than the commercial free water content as well as to so-called moist materials such as are discharged in crumbly form from filter presses, suction filters, etc., in the course of manufacture.

The dehydration of the reaction material under vacuum can be continued until the material practically contains no more free water, i.e., is substantially completely anhydrous, or only until it is so dehydrated that in the ensuing thermal treatment no gel-formation or lump formation can take place. In general the dehydrated material contains so little moisture that practically no moisture will evaporate from it in the course of the ensuing thermal treatment and cooling.

The thermal treatment and the cooling, each with the exclusion of oxygen, then can be carried out under subatmospheric, normal, or a superatmospheric pressure. When carried out in a non-oxidizing gaseous atmosphere, nitrogen, carbon dioxide, gaseous $SO_2$, or other gases inert to the material can be used. When desired, the pH of the material can be adjusted to a desired value prior to the cooling by the addition of a suitable neutralizing medium, e.g. ammonia.

In order to obtain a homogeneous product, the process is preferably carried out in autoclaves provided with suitable devices for continuously stirring the reaction material and for adjusting the heating temperature.

According to the present invention, finely divided mucilaginous substances such as gums and the like are converted into extraordinarily valuable degradation products and derivatives, and the operations are carried out under most advantageous conditions. Being performed under vacuum and/or with the exclusion of oxygen, the process is explosion-proof. The products which result, in comparison with products obtained according to the hitherto known processes, are brighter in color and more uniform in quality and in the degree of conversion; they have a smaller content of oxidized matter and better film-forming characteristics; and they can be prepared with degradation to any desired degree of viscosity. Because the substances treated retain their reactive OH-groups, derivatives can be obtained from them which show more uniform substitutions and are distinguished by higher solubilities and more flexible film characteristics than in the case of known derivates of like substances. By virtue of these improvements the products obtained according to this invention are especially suitable for impregnating paper and for the surface sizing of paper, as well as for finishing, sizing and film printing in the processing of textiles.

The practice of the invention will be further understood from the following illustrative examples.

*Example 1*

200 kg. of guar flour of commercial dryness (e.g., 15% $H_2O$) and in native condition is impregnated under vacuum of about 30 mm. mercury with 405 grams of HCl gas and, while maintaining the vacuum at about 60 mm. of mercury, the mass is brought gradually within 3 hours to 97° C. with continuous removal of water, whereupon the temperature is increased to 110° C. Then the vacuum is abolished by nitrogen and the temperature is maintained at 110° C. until a desired degree of modification is attained, whereupon the mass is cooled to normal temperature in the nitrogen atmosphere.

*Example 2*

175 kg. of caruba flour in native condition is sprayed with 750 cm.$^3$ of concentrated (36%) hydrochloric acid and then subjected to vacuum of about 100 mm. mercury while being stirred in an autoclave. Subsequently under continuous decrease of the water content, while maintaining the vacuum, the temperature is increased to 95° C. within 2½ hours. Then the material is heated under continuing vacuum to 130° C. and maintained at this temperature, for example, for about 3½ hours, until the desired degree of conversion is attained, whereupon the mass is cooled under vacuum.

*Example 3*

175 kg. of commercially dry guar flour pretreated by fine grinding is mixed with 175 kg. of degraded, pulverulent potato starch (thin boiling or oxidized starch). The mixture is subjected to vacuum of about 30 mm. mercury in an autoclave provided with a stirrer and acidified with 650 grams of HCl gas. Then the mixture is brought gradually to 98° C. while maintaining a vacuum of about 60 mm. mercury and continuously decreasing the water content, whereupon the temperature is increased to 160° C. Then the vacuum is replaced by $CO_2$ gas which is introduced into the autoclave to a pressure of 1.5 atmospheres, and heating at 160° C. is continued, for example, for about 2 hours, until a desired degree of modification is attained. The material is then cooled in the $CO_2$ atmosphere.

*Example 4*

100 kg. of guar powder in commercially dry native condition is acidified with 175 g. of HCl gas under vacuum. While maintaining the vacuum, the mass is heated with continuous removal of water until within 3½ hours the temperature reaches 107° C., whereupon the temperature is raised to 130° C. Then the material is kept under vacuum and at 130° C. for 1¼ hours, whereby the desired modification is attained, and then the product is cooled under vacuum.

A 1% solution of the resulting product, prepared by stirring in cold water, shows a pH value of 4.9 and the following viscosities measured by a Brookfield-Viscosimeter at 20 r.p.m. and 25° C.: 15 centipoises after one hour; 17.5 centipoises after 24 hours.

A 1% solution of the same product, after being heated for 10 minutes to 95° C. and cooled to 25° C., shows the following viscosities: 20 centipoises (cp.) after 1 hour; 37 cp. after 24 hours. A 3% solution of this product, after being heated for 10 minutes to 95° C. and cooled to 25° C., shows a paste-like consistency and a viscosity of 6,300 cp. This viscosity corresponds in order of magnitude to that (6,150 cp.) of a 1% solution of the guar flour used as the starting material.

The degradation product of this example is valuable for use as a base for printing thickeners, particularly in the case of special fibres, such as acetate and nylon, in connection with which a higher amount of dry substance content is required. In small concentrations this product can be used advantageously for the production of surface-sized and coated papers in combination with starch derivatives.

*Example 5*

300 kg. of pulverulent native caruba powder of commercial dryness is impregnated with 524 g. of HCl gas under vacuum and then is brought gradually to 105° C. while maintaining a vacuum of 67 mm. Hg absolute and stirring the mass in an autoclave. The material thus is subjected to a progressively increased removal of its water content. Thereafter the temperature is increased to 130° C., while maintaining the vacuum, and the mass is subjected to continuing stirring under vacuum at this temperature for a period of about 2 hours until the desired degree of conversion is attained, whereupon cooling under vacuum follows.

A 1% solution of the resulting product, prepared by stirring in the cold, is practically colorless, has a pH value of 4.4 and the following viscosity measured by a Brookfield-Viscosimeter at 20 r.p.m. and 25° C.: 12.5 cp. after 1 hour; 15 cp. after 24 hours.

A 1% solution of the same product, after being heated for 10 minutes to 95° C. and cooled to 25° C., shows the following viscosities: 50 cp. after 1 hour; 72 cp. after 24 hours.

A 3% solution of the same product, after being heated for 10 minutes to 95° C. and cooled to 25° C., shows a paste-like lardy consistency and a viscosity of 4,500 cp. This value is somewhat lower than that (5,250 cp) of a 1% solution of the starting material.

The degradation product thus obtained is particularly valuable for use in various food products such as, for example, dessert products, soup products, ice creams, instant puddings, and instant sauces. It is also useful for stabilizing oil-water emulsions, thereby refining the aroma of the emulsions and giving them a desirable more mucous consistency.

As the material is degraded with the exclusion of oxidizing media, the product is free from substances of undesired taste, such as aldehydes, ketones and the like; so it has wide ranges of usefulness in the foodstuff industry.

What is claimed is:

1. A process for producing a modification product of a natural substance of high molecular weight selected from the group consisting of galactomannanes, polyuronic acids and galactanes and mixtures containing any of the same, which comprises dehydrating under vacuum, at gradually increasing temperatures below 110° C. and insufficient to cause pasting in the mass, a finely divided mass of said substance containing free moisture, until the mass is so dehydrated that practically no moisture will evaporate from it in the ensuing treatment; then, while excluding oxygen from the mass, heating it at a higher temperature not exceeding 180° C. but effective to modify said substance chemically, until a desired degree of modification is attained; and then cooling the mass while excluding oxygen from it.

2. A process for producing a modification product of a natural substance of high molecular weight selected from the group consisting of galactomannanes, polyuronic acids and galactanes and mixtures containing any of the same, which comprises dehydrating under vacuum, at gradually increasing temperatures below 110° C. and insufficient to cause pasting in the mass, a finely divided mass of said substance containing free moisture and impregnated with a reactant capable of modifying said substance chemically, until the mass is so dehydrated that practically no moisture will evaporate from it in the ensuing treatment; then, while excluding oxygen from the mass, heating it at a higher temperature not exceeding 180° C. but effective to cause said reactant to modify said substance chemically, until a desired degree of modification is attained; and then cooling the mass while excluding oxygen from it.

3. A process for producing a modification product of a natural substance of high molecular weight selected from the group consisting of galactomannanes, polyuronic acids and galactanes and mixtures containing any of the same, which comprises dehydrating under vacuum at temperatures gradually increasing into the range of 90° to 110° C. a finely divided mass of said substance containing free moisture and impregnated with an acidic reactant capable of promoting degradation of said substance, until the mass practically ceases to give up moisture; then heating the mass under continued vacuum to a higher temperature not exceeding 180° C. but sufficient to cause thermal degradation of said substance, and heating the mass at such higher temperature while excluding oxygen from it until a desired degree of degradation of said substance is attained; and then cooling the mass while excluding oxygen from it.

4. A process according to claim 3, the heating at said higher temperature and the cooling being effected under continued vacuum.

5. A process according to claim 3, the heating at said higher temperature being completed and the cooling being effected in a gaseous atmosphere inert to said substance.

6. A process according to claim 3, said higher temperature being in the range of about 130° to 180° C.

7. A process for producing a modification product of a natural substance of high molecular weight selected from the group consisting of galactomannanes, polyuronic acids and galactanes and mixtures containing any of the same, which comprises, while continuously stirring a finely divided mass of said substance in a container; subjecting the mass to a vacuum; then introducing to the mass and impregnating it with a reactant capable of modifying said substance chemically; then dehydrating the mass under vacuum, at gradually increasing temperatures below 110° C. and insufficient to cause pasting in the mass, until the mass is so dehydrated that practically no moisture will evaporate from it in the ensuing treatment; then, while excluding oxygen from the mass, heating it at a higher temperature not exceeding 180° C. but effective to cause said reactant to modify said substance chemically, until a desired degree of modification is attained; and then cooling the mass while excluding oxygen from it.

8. Modification product of a mucilaginous natural substance selected from the group consisting of galactomannanes, polyuronic acids and galactanes and mixtures containing any of the same, consisting essentially of a finely divided product of the thermal treatment, at elevated temperatures sufficient to degrade the material and with the exclusion of oxygen from the material, of a finely divided mass of said substance dehydrated under vacuum at progressively increased temperatures to a moisture content so low that practically no moisture evaporates from the material during the thermal treatment.

9. Modification product of a mucilaginous natural substance selected from the group consisting of galactomannanes, polyuronic acids and galactanes and mixtures containing any of the same, consisting essentially of a finely divided product of the thermal treatment, at elevated temperatures sufficient to degrade the material and with the exclusion of oxygen from the material, of a finely divided mass of said substance impregnated with a reactant capable of modifying the material chemically and dehydrated in the presence of said reactant under vacuum at progressively increased temperatures to a moisture content so low that practically no moisture evaporates from the material during the thermal treatment.

References Cited by the Examiner

UNITED STATES PATENTS

| | | | |
|---|---|---|---|
| 2,624,727 | 1/1953 | Le Gloahec | 260—209 |
| 2,627,516 | 2/1953 | Lohmar | 260—209 |
| 2,900,284 | 8/1959 | Oshima et al. | 260—209 |
| 3,019,138 | 1/1962 | Doggett et al. | 260—209 |
| 3,042,668 | 7/1962 | Monti | 260—209 |

LEWIS GOTTS, *Primary Examiner.*

J. R. BROWN, *Assistant Examiner.*